United States Patent
Kusase et al.

(10) Patent No.: US 8,860,274 B2
(45) Date of Patent: Oct. 14, 2014

(54) MOTOR PROVIDED WITH TWO STATORS ARRANGED RADIALLY INSIDE AND OUTSIDE ROTOR

(75) Inventors: Shin Kusase, Obu (JP); Yousuke Kaname, Kariya (JP); Naoto Sakurai, Nagoya (JP)

(73) Assignee: Denso Corporation, Kariya (JP)

( * ) Notice: Subject to any disclaimer, the term of this patent is extended or adjusted under 35 U.S.C. 154(b) by 194 days.

(21) Appl. No.: 13/112,328

(22) Filed: May 20, 2011

(65) Prior Publication Data

US 2011/0285238 A1 Nov. 24, 2011

(30) Foreign Application Priority Data

May 20, 2010 (JP) ................................. 2010-116267

(51) Int. Cl.
  *H02K 1/27* (2006.01)
  *H02K 16/04* (2006.01)
  *H02K 1/16* (2006.01)

(52) U.S. Cl.
  CPC ...................................... *H02K 16/04* (2013.01)
  USPC ................. 310/156.48; 310/156.46; 310/112; 310/266

(58) Field of Classification Search
  CPC ........... H02K 16/04; H02K 3/12; H02K 1/16; H02K 1/27
  USPC .......... 310/156.48, 156.49, 266, 156.46, 112, 310/114
  See application file for complete search history.

(56) References Cited

U.S. PATENT DOCUMENTS

| | | | | |
|---|---|---|---|---|
| 5,345,133 | A * | 9/1994 | Satake | 310/266 |
| 5,682,072 | A * | 10/1997 | Takahashi | 310/156.46 |
| 6,093,992 | A * | 7/2000 | Akemakou | 310/266 |
| 7,719,153 | B2 * | 5/2010 | Hsu | 310/156.56 |
| 7,902,712 | B2 | 3/2011 | Nakamasu et al. | |
| 2003/0015931 | A1 * | 1/2003 | Nishimura | 310/184 |
| 2009/0212652 | A1 * | 8/2009 | Nakamasu et al. | 310/156.53 |

FOREIGN PATENT DOCUMENTS

JP  H03-139156  6/1991
JP  H05-344698  12/1993

(Continued)

OTHER PUBLICATIONS

Machine translation of JP2002-335658A (translated Feb. 2013, published Nov. 2002).*

(Continued)

*Primary Examiner* — Michael Andrews
(74) *Attorney, Agent, or Firm* — Nixon & Vanderhye P.C.

(57) ABSTRACT

In a double-stator motor has a rotary shaft, an annular rotor is coupled with a rotary shaft. First and second three-phase stators are arranged inside and outside to the rotor in the radial direction and formed to generate first and second rotating magnetic fields in response to three-phase currents, respectively. The rotor has an even number of segment poles made of soft magnetic material and arranged mutually separately at positions of the rotor. The positions are equally distanced apart from the rotary shaft in the radial direction and in the circumferential direction. Each of the first and second three-phase stators has magnetic poles which are the same in the number of poles as the segment poles and the magnetic poles are positioned such that magnetomotive forces from the magnetic poles are faced to each other between the magnetic poles of the first and second three-phase stators.

14 Claims, 11 Drawing Sheets

(56) References Cited

FOREIGN PATENT DOCUMENTS

| JP | 11-164536 | 6/1999 | | |
|----|-----------|--------|---|---|
| JP | H11-511948 | 10/1999 | | |
| JP | P2000-102198 A | 4/2000 | | |
| JP | 2002335658 A | * 11/2002 | ............. | H02K 16/04 |
| JP | P2002-335658 A | 11/2002 | | |
| JP | P2003-032978 A | 1/2003 | | |
| JP | P2004-260970 A | 9/2004 | | |
| JP | P2006-333544 A | 12/2006 | | |
| JP | P2007-185094 A | 7/2007 | | |
| JP | 2007-261342 | 10/2007 | | |
| WO | WO 2006/092924 | 9/2006 | | |

OTHER PUBLICATIONS

Japanese Official Action dated Oct. 1, 2012 issued in corresponding Japanese Application No. 2010-116267, with English translation.
Japanese Office Action dated Jan. 10, 2012, issued in corresponding Japanese Application No. 2010-116267 with English Translation.
Office Action (2 pages) dated Jul. 2, 2013, issued in corresponding Japanese Application No. 2010-116267 and English translation (2 pages).

* cited by examiner

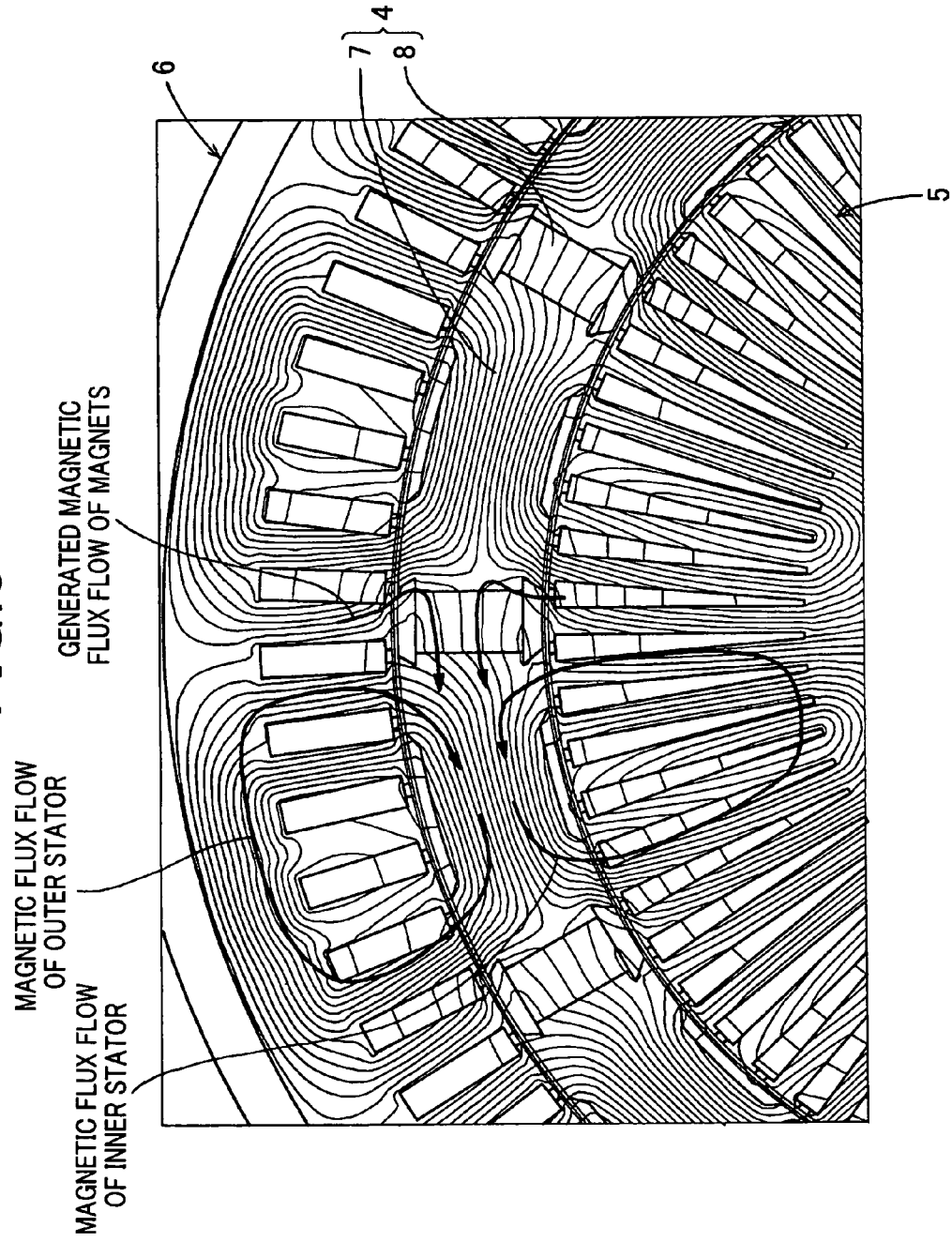

FIG.6A

| | CONVENTIONAL MOTOR | INVENTIVE MOTOR |
|---|---|---|
| | ANALYTICAL MODEL  CORE MEMBER / PERMANENT MAGNET | ANALYTICAL MODEL  CORE MEMBER / PERMANENT MAGNET |
| NUMBER OF POLES, NUMBER OF WINDING TURNS, CONNECTION | 12 POLES, 16 OUTER TURNS+ 16 INNER TURNS, Y CONNECTION | 12 POLES, 16 OUTER TURNS+ 16 INNER TURNS, Y CONNECTION |
| OUTER DIAMETER OF STATOR, LAMINATE CORE THICKNESS | Φ264, 25[mm] | Φ264, 25[mm] |
| VOLUME OF NEODYMIUM MAGNET | 155.8[cm³] | 33.6[cm³] |
| LOW-SPEED TORQUE AT 1000 rpm | 220[Nm] | 230[Nm] |
| HIGH-SPED TORQUE AT 8000 rpm | 20[Nm] | 70[Nm] |

FIG.6B

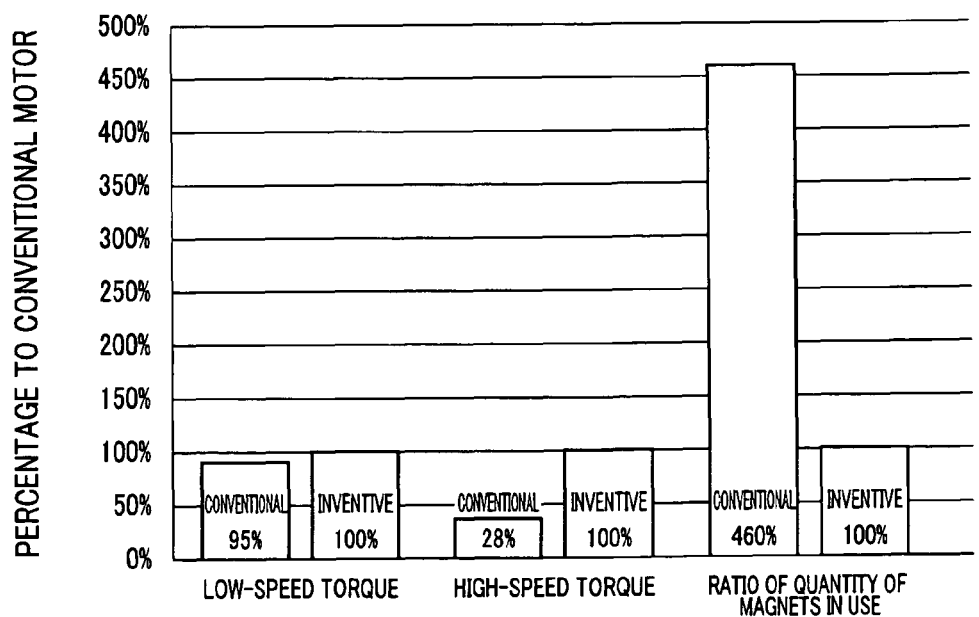

DISTRIBUTED WINDING (BASIC)
(EQUAL NUMBER OF INNER AND OUTER SLOTS,
NUMBER OF WINDING TURNS: 16)

OUTPUT: 230 Nm

MOTOR PROVIDED WITH TWO STATORS ARRANGED RADIALLY INSIDE AND OUTSIDE ROTOR

CROSS-REFERENCE TO RELATED APPLICATION

This application is based on and claims the benefit of priority from earlier Japanese Patent Application No, 2010-116267 filed May 20, 2010, the description of which is incorporated herein by reference.

BACKGROUND OF THE INVENTION

1. Technical Field of the Invention

The present invention relates to a double-stator motor having a configuration in which a first three-phase stator is arranged radially inside a rotor and a second three-phase stator is arranged radially outside the rotor.

2. Related Art

Several types of motors, such as motor-generators and in-wheel motors, have been known. A motor-generator is disposed between an engine and a transmission of a vehicle. An in-wheel motor is incorporated into a drive wheel to directly drive the drive wheel. These motors have suffered from installation constraints that are ascribed to the purposes of their use. In other words, due to the limited space of installation, these motors have been desired to have a small axial dimension, or a thin shape.

In order to cope with this issue, double-stator motors have been suggested in which stators are arranged inside and outside a rotor.

For example, JP-A-H03-139156 or JP-A-2007-251342 discloses such a double-stator motor. As can be seen in a model illustrated in FIG. 1A, the double-stator motor as disclosed in these documents includes an inner stator 100, an outer stator 110, a rotor core 120 arranged between the inner and outer stators 100 and 110 to face the inner and outer stators 100 and 110, and permanent magnets 130 and 140 provided at inner and outer surfaces, respectively, of the rotor core 120.

In this type of double-stator motor, magnetic fields are formed by the permanent magnets 130 and 140. Meanwhile, winding magnetomotive force (i.e. in ampere turns) is caused at both of the inner and outer stators 100 and 110. The winding magnetomotive force is added in series to the magnetic fields as indicated by the arrows in FIG. 1A to work on each rotor pole consisting of the two inner and outer permanent magnets 130 and 140. Therefore, the inner and outer stators 100 and 110 are able to generate large torque if the laminate thickness of each of the stators is small. In other words, this type of double-stator motor is able to reduce the laminate core thickness of stators, which is required to obtain predetermined target torque characteristics.

FIG. 1B is a contour diagram analyzing the magnetic flux flow in the double-stator motor shown in FIG. 1A.

However, well-known double-stator motors such as the one mentioned above have the following problems (1) to (3) which make it difficult to use these motors in practice.

(1) Fabrication cost is high because of the use of a lot of strong magnets.

(2) The output is small in relation to the quantity of magnets in use and to the size and volume of the motor.

(3) The efficiency is poor in high-speed rotation, such as in high-speed cruising.

As a result of the analysis and study of the above problems (1) to (3) by the inventors of the present invention, the following underlying causes have been found.

The reason why a lot of strong magnets are needed is that, in a narrow space formed between inner and outer stators, magnets are required to supply sufficient magnetic flux to each stator and required to have demagnetization strength against the demagnetizing fields loaded from the two series stator winding ampere turn.

The reason why a large output cannot be obtained in relation to the quantity of magnets and to the size and volume of the motor is that the cores are saturated and thus magnetic flux leakage is increased. Specifically, magnetic flux is passed through the cores of the inner and outer stators and two gaps (four gaps regarding a magnetic flux loop of one pole pair). Therefore, magnetic flux will have a long path and the magnetic resistance will be increased accordingly, leading to the tendency of magnetic flux leakage. Due to the large magnetic resistance, magnets having very strong magnetomotive force are required to be arranged to thereby pass desired magnetic flux. Accordingly, the difference in magnetic potential between portions of the magnetic circuit will become large, further accelerating the tendency of magnetic flux leakage.

The reason why the efficiency is poor in high-speed rotation is that the cores are likely to be saturated, as mentioned above, and thus eddy current loss and hysteresis loss are increased, and, being dependent on the frequency, core loss is increased.

SUMMARY

Hence it is desired to provide a double-stator motor at low cost by reducing the number of permanent magnets and to enhance the efficiency in high-speed rotation by suppressing core loss.

As a basic configuration, an embodiment provides a double-stator motor comprising: a rotary shaft; an annular rotor coupled with the rotary shaft so that the rotor is allowed to rotate together with the rotary shaft, the rotor having a radial direction and a circumferential direction; a first three-phase stator arranged inside of the rotor in the radial direction and formed to generate a first rotating magnetic field in response to a three-phase current being supplied to the first three-phase stator; and a second three-phase stator arranged outside of the rotor in the radial direction and formed to generate a second rotating magnetic field in response to a three-phase current being supplied to the first three-phase stator. The magnetic flux caused by the first rotating magnetic flux and the magnetic flux caused by the second rotating magnetic flux flowing in parallel with each other and separately from each other. In this configuration, the rotor comprises an even number of segment poles made of soft magnetic material and mutually separately arranged at positions of the rotor, the positions being at equally distanced apart from the rotary shaft in the radial direction and in the circumferential direction. Each of the first and second three-phase stators has magnetic poles which are the same in the number of poles as the segment poles and the magnetic poles are positioned such that magnetomotive forces from the magnetic poles are faced to each other via the segment poles between the magnetic poles of the first and second three-phase stators.

With this configuration, the magnetomotive force caused by the first three-phase stator is in face-to-face relationship with the magnetomotive force caused by the second three-phase stator, with the segment poles (segmented magnetic poles) being interposed therebetween. Therefore, the magnetic flux caused by the first three-phase stator and the magnetic flux caused by the second three-phase stator can pass through the segment poles in the circumferential direction, forming two magnetic flux loops in parallel. In this case, the number of gaps for the magnetic flux to pass is two regarding one magnetic flux loop. Thus, compared to the well-known double stator motors, magnetic resistance of the magnetic circuit is reduced. As a result, magnetic flux leakage is reduced, and core saturation is mitigated accordingly to thereby suppress core loss. In this way, efficiency in high-speed rotation is enhanced.

Further, the magnetic flux passing through the segment poles in the circumferential direction induces generation of reluctance torque, or attractive torque, of iron pieces that are the segment poles. Therefore, it is not necessary to use lots of strong magnets, and thus the double-stator motor is fabricated at low cost.

Preferably, the first and second three-phase stators have windings which generate the magnetomotive forces which are the same as each other, each of the magnetomotive forces being defined as a product of the number of windings per each phase and current passing through the windings.

In this case, the magnetic flux mutually interlinking between the first three-phase stator and the second three-phase stator is reduced. As a result, direct-axis inductance is reduced, increasing, in turn, reluctance torque.

Still preferably, each of the first and second three-phase stators has windings, the windings of the first three-phase stator being electrically connected in series to the windings of the second three-phase stator every phase corresponding to each other between the first and second three-phase stators.

The circumferential speed of the magnetic flux distribution in the gap formed between the first three-phase stator and the rotor is different from that in the gap formed between the second three-phase stator and the rotor. Also, the induced voltage is different between the first and second three-phase stators. In this regard, serial connection of the coils of corresponding phases between the stators can regulate the current passed through the windings of the respective stators even when the induced voltage is different between the stators.

It is also preferred that the first and second three-phase stators have slots in which windings are wound, the slots of the first three-phase stator being larger in a sectional area of each slot and smaller in the number of slots than the slots of the second three-phase stator.

When the number of slots is the same in the first three-phase stator and the second three-phase stator, each slot of the first three-phase stator arranged inside the rotor will have a cross section smaller than that of each slot of the second three-phase stator arranged outside the rotor, making the winding work difficult.

In this regard, when the number of slots of the first three-phase stator is made smaller than that of the second three-phase stator, the cross section of each slot of the first three-phase stator is ensured to be made large. In this way, the winding work is facilitated (or winding is easily provided).

Still, by way of example, the first and second three-phase stators have the same number of core teeth around which windings are concentrated-wound, the core teeth of the first three-phase stator being the same in number as the core teeth of the second three-phase stator, wherein each of the core teeth of the first three-phase stator is, in the circumferential direction, located between two core teeth mutually adjacently located among the core teeth of the second three-phase stator.

Unlike distributed winding, concentrated winding involves no overlap between coil end portions, and thus can reduce the length of coil perimeter to thereby reduce coil resistance. Owing to the low resistance, the number of winding turns may be increased accordingly in the concentrated winding than in the distributed winding. In this way, winding magnetomotive force is increased to thereby enhance the motor performance.

However, concentrated winding has a problem of periodically causing unevenness, i.e. repetition of high magnetic flux density and low magnetic flux density, in adjacently located segment poles. In this regard, in the present disclosure, the core teeth of the first three-phase stator are circumferentially shifted from those of the second three-phase stator. Specifically, each core tooth of the first three-phase stator is located at a position falling between the adjacently located core teeth of the second three-phase stator. Thus, the unevenness of magnetic flux density is mitigated throughout the segment poles. In other words, magnetic flux density is made even, so that the motor performance per physical size is enhanced.

As another preferred example, each of the core teeth of the first three-phase stator is, in the circumferential direction, located at a center between the two core teeth mutually adjacently located among the core teeth of the second three-phase stator.

For example, when the number of teeth (the number of core teeth) of each of the first and second three-phase stators is three in an electrical angle of $2\pi$, the core teeth of the first three-phase stator may be arranged so as to have an electrical angular difference of 60° from the core teeth of the second three-phase stator. Thus, the unevenness of the magnetic flux density is effectively mitigated to thereby further enhance the motor performance per physical size.

As another example, the stator may have outer and inner circumferential surfaces in the radial direction and the segment poles of the rotor may have concaves formed on each of the outer and inner circumferential surfaces or formed on either one of the outer and inner circumferential surfaces.

With this configuration, the concave is provided in both of or either one of the outer and inner peripheral surfaces of each segment pole that faces the rotor to increase, accordingly, the size of the gap between the rotor and the stator. As a result, direct-axis inductance is reduced to thereby establish a reverse-salient-pole relationship. Therefore, the effect of increasing reluctance torque is further enhanced.

Each of the concaves of the segment poles may be asymmetrically positioned to a center of corresponding one of the segment poles in the circumferential direction so that each of the concaves is positioned on either a forward side or a backward side in rotational phase in a rotational direction of the motor.

For example, the double-stator motor of the present disclosure may be used as a motor-generator to function as a motor in power-running operation and as a generator in regenerative operation. In this case, however, magnetic distribution is deviated in these operations with reference to the circumferential direction of the segment poles. In this regard, for example, the position of each concave may be brought to the backward side of the rotational direction of the rotor with reference to the circumferential center of the segment pole. Being located in this position, each concave contributes to the increase of torque in the power-running operation to thereby enhance the function as a motor. On the other hand, the position of each concave may be brought to the forward side of the rotational direction of the rotor with reference to the circumferential center of the segment pole. This arrangement exerts a good effect in the regenerative operation to thereby enhance the function as a generator.

It is also preferred that the rotor has a plurality of permanent magnets, a plurality of inner bridges, and a plurality of outer bridges, the inner and outer bridges being located radially inward and outward in the radial direction, the inner-side bridges each linking both inner-side parts of two segments poles mutually adjacently located among the segment poles arranged in the circumferential direction, the outer-side bridges each linking both outer-side parts of two segments poles mutually adjacently located among the segment poles arranged in the circumferential direction. In this configuration, each of the permanent magnets is held between the inner and outer bridges facing with each other in the radial direction between two segment poles mutually adjacently positioned among the segment poles arranged in the circumferential direction, the permanent magnets being magnetized in the circumferential direction when being held in the rotor.

In this configuration, permanent magnets (hereinafter just referred to as "magnets") are not arranged at the inner and outer peripheral surfaces of each segment pole, which surfaces are opposed to the first and second three-phase stators, respectively. Instead, magnets are arranged at circumferential side faces of each segment pole. Specifically, magnets are each arranged between circumferentially adjacent segment poles, with the magnets being magnetized in the circumferential direction. Thus, magnetic flux is supplied, in parallel, from the magnets to the first and second three-phase stators. In this case, the poles of the magnets and the poles of the first and second three-phase stators will not be directly opposed to each other. Therefore, the magnets are not required to have excessive demagnetization strength against the demagnetizing fields emitted from the first and second three-phase stators.

Also, according to the configuration described above, magnetic flux is supplied, in parallel, to the first and second three-phase stators. Specifically, two magnetic flux loops are formed in parallel, and thus the number of gaps for the magnetic flux to pass is only two regarding one magnetic flux loop. Thus, compared to the well-known techniques (the techniques disclosed in JP-A-H03-139156 or JP-A-2007-261342) in which one magnetic flux loop passes through both of inner and outer stators in series, magnetic resistance of the magnetic circuit is reduced. Accordingly, only small magnetomotive force may be applied by the magnets for the reduction of the quantity of magnets to be used. Also, since strong magnets are not used for the application of high magnetomotive force, magnetic flux leakage is reduced, and thus core saturation is mitigated accordingly, thereby suppressing core loss.

In addition, since the inner and outer peripheral surfaces of the magnets are covered with bridges, the magnets are reliably held (against centrifugal force, in particular).

BRIEF DESCRIPTION OF THE DRAWINGS

In the accompanying drawings:

FIG. 5 is a contour diagram illustrating magnetic flux flow in the first embodiment;

FIG. 6A is an explanatory diagram comparing the motor according to the first embodiment with a motor of conventional art, regarding design and effects;

FIG. 6B is a bar graph comparing the effects exerted by the motor of conventional art with those exerted by the motor according to the first embodiment to clarify the differences;

DETAILED DESCRIPTION OF THE PREFERRED EMBODIMENTS

With reference to the accompanying drawings, hereinafter will be described several embodiments of the present invention.

First Embodiment

Referring to FIGS. 2 to 6A and 6B, a first embodiment of the present invention is described. The first embodiment is an example in which a double-stator motor of the present invention is applied to a motor-generator 1 of a hybrid vehicle.

Figure 1B:
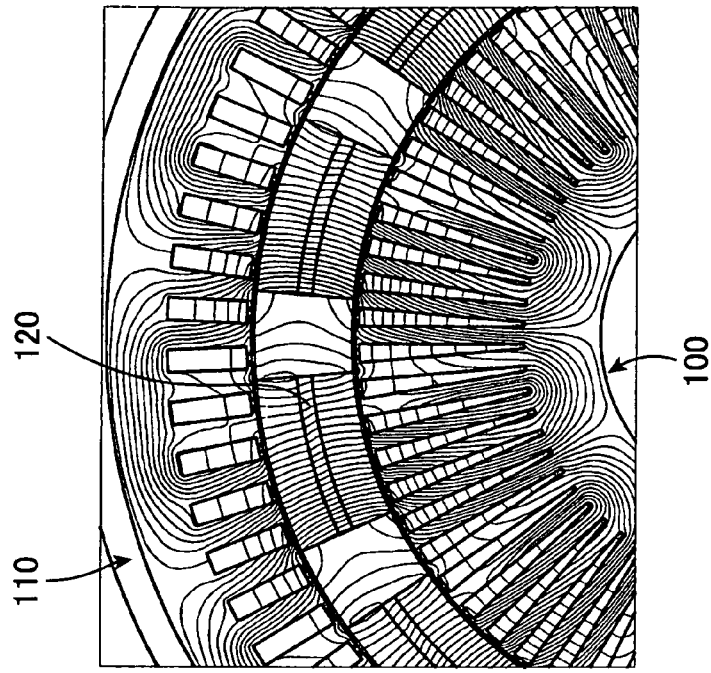
FIG. 1B is a contour diagram illustrating magnetic flux flow of the motor according to prior art.
Figure 1A:
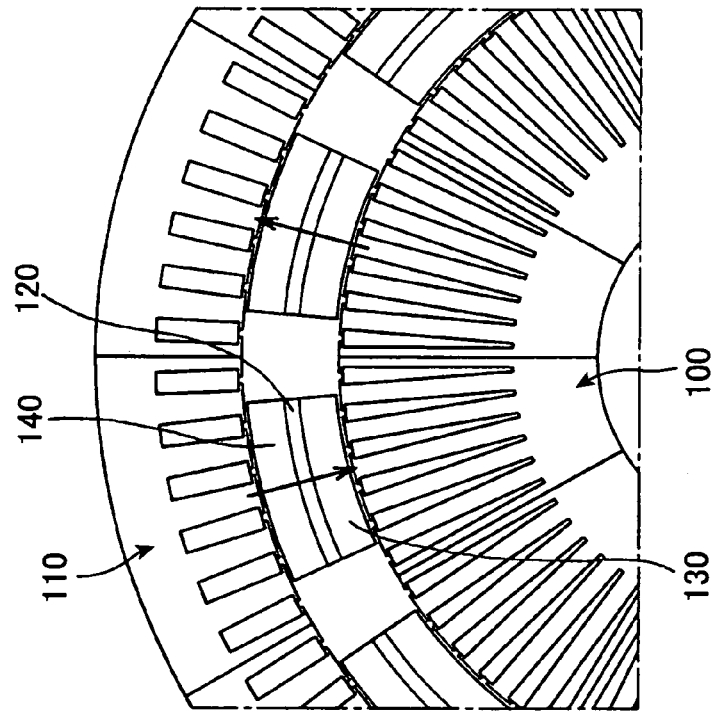
FIG. 1A is a partial model diagram illustrating the structure of a principal part of a motor according to prior art.
Figure 2:
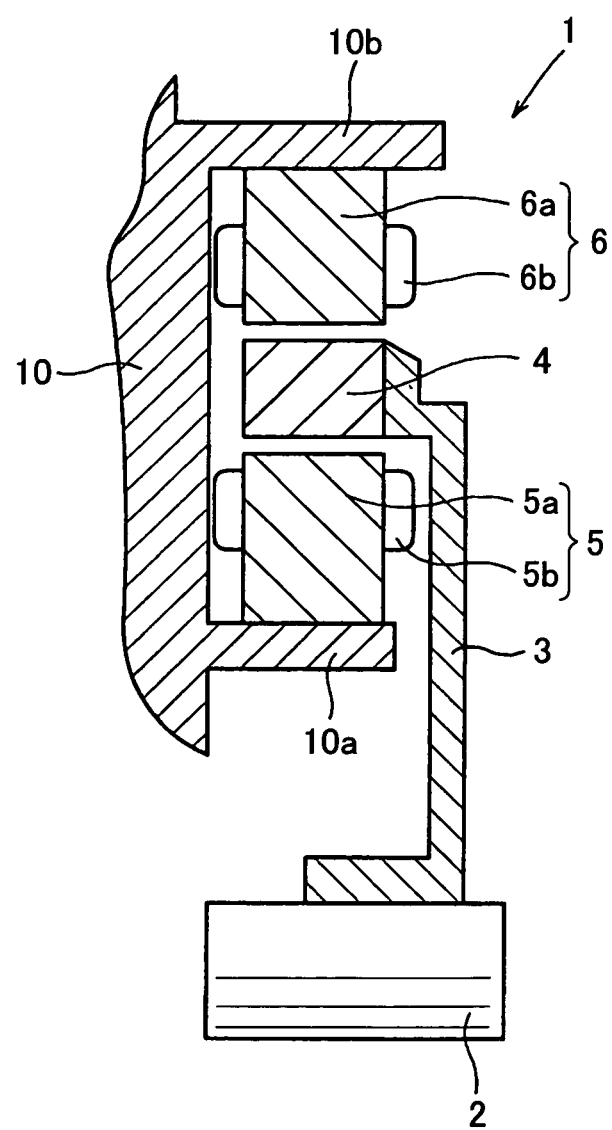
FIG. 2 is a cross-sectional diagram illustrating a general configuration of the motor according to a first embodiment of the present invention.
Figure 3:
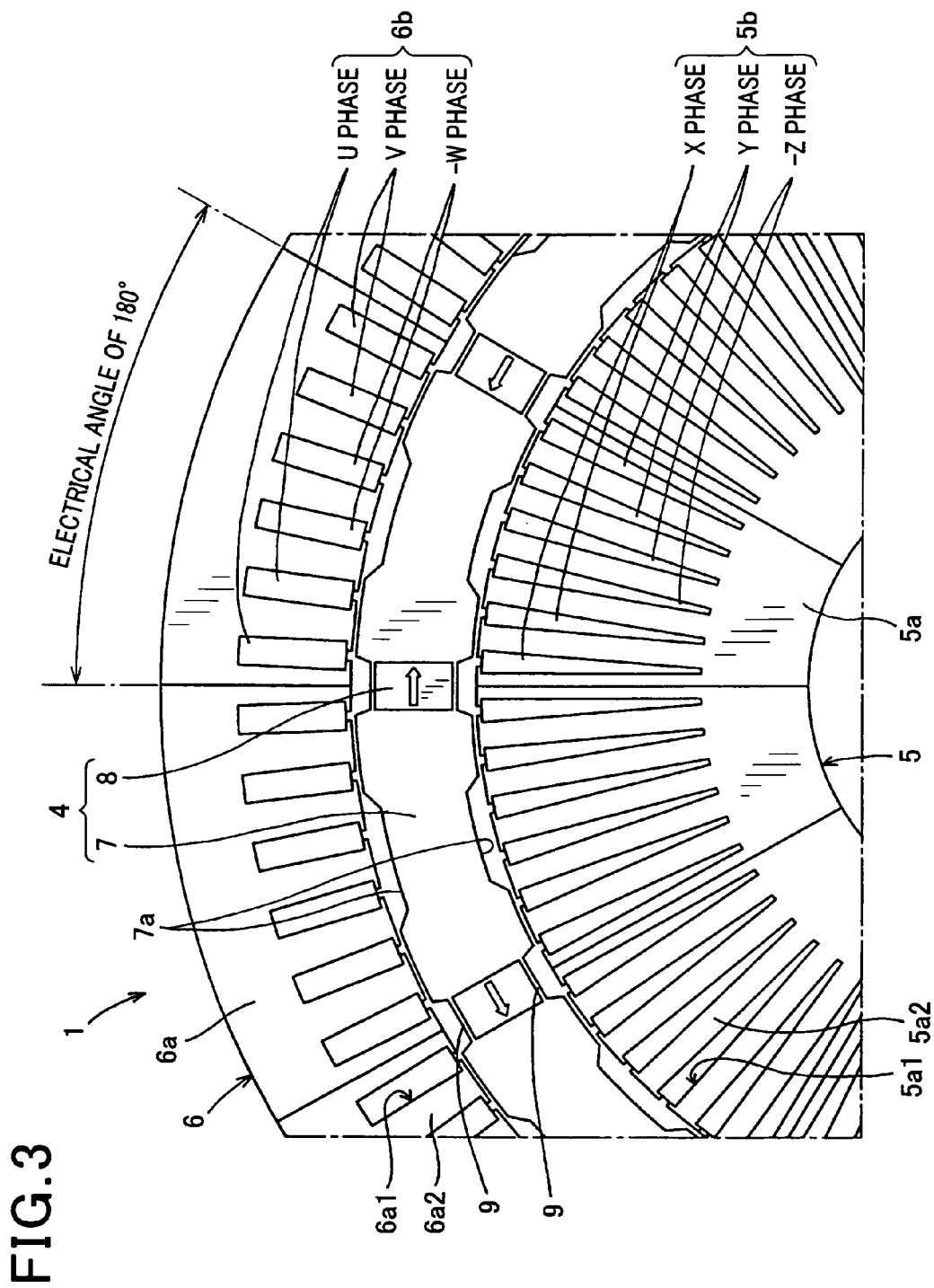
FIG. 3 is a partial cross-sectional diagram illustrating the structure of a principal model of the first embodiment.

FIG. 2 is a cross-sectional diagram illustrating a general configuration of the motor-generator 1. FIG. 3 is a partial cross-sectional diagram illustrating the structure of a principal part of a motor, as the motor-generator 1, according to the first embodiment of the present invention.

As shown in FIG. 2, the motor-generator 1 includes a rotary shaft 2, a disc holder 3, an annular rotor 4, an inner stator 5 (first three-phase stator of the present invention) and an outer stator 6 (second three-phase stator of the present invention). The annular rotor 4 is connected to the rotary shaft 2 via the disc holder 3 so as to be coaxial with the rotary shaft 2. The inner stator 5 is disposed on a radially inner side of the rotor 4. The outer stator 5 is disposed on a radially outer side of the rotor 4. The motor-generator 1 is accommodated in an annular motor case 10 having an inner cylindrical portion 10a and an outer cylindrical portion 10b.

The motor-generator 1 is configured to be suitable for two operation modes, i.e. a power-running operation mode for exerting a function as a motor, and a regenerative operation mode for exerting a function as a generator.

For example, the rotary shaft 2 has an end that is the left-end side as viewed in FIG. 2, which is connected to a crank shaft (not shown) of an engine, and another end that is the right-end side as viewed in FIG. 2, which is connected to a gear shaft (not shown) of a transmission.

As shown in FIG. 3, the rotor 4 is configured by an even number of segment poles (i.e., segmented magnetic poles) 7 made of soft magnetic material and an even number of permanent magnets (hereinafter referred to as "magnets 8"). The segment poles 7 are arranged being evenly distanced from the rotor shaft 2 in the radial direction and evenly spaced apart from each other in the circumferential direction. The magnets 8 are each arranged between adjacently located segment poles 7. The number of the segment poles 7 is equal to that of the magnets 8. The example of the rotor 4 shown in FIG. 3 has twelve segment poles 7 and twelve magnets 8.

As shown in FIG. 3, each segment pole 7 is formed into an arcuate shape with a circumferential width ranging from 90° inclusive to 180° in terms of electrical angle. Each segment pole 7 is configured, for example, by laminating a plurality of thin electromagnetic steel plates. Each segment pole 7 has an inner peripheral surface and an outer peripheral surface in each of which a concave 7a is formed in a circumferentially central portion of the segment pole.

The circumferentially adjacent segment poles 7 have a radially inner peripheral side and a radially outer peripheral side on each of which the adjacent segment poles 7 are connected via a bridge 9. Specifically, on each of the inner and outer peripheral sides of the even number of segment poles 7, the segment poles 7 are circumferentially connected via the bridges 9 for integration, forming a ring shape. The integrated segment poles 7 and bridges 9 in a ring shape are fixed to the disc holder 3 using bolts, nuts and the like.

Each magnet 8 is made up such as of a neodymium magnet, one of rare earth magnets. The magnets 8 are each located between circumferentially adjacent segment poles 7, being inserted between the bridge 9 on the inner peripheral side and the bridge 9 on the outer peripheral side, which connect the adjacent segment poles 7, and are circumferentially magnetized. As indicated by the hollow arrows in FIG. 3, the circumferentially adjacent magnets 8 sandwiching a segment pole 7 are arranged such that the S poles or N poles of the adjacent magnets 8 are opposed to each other in the circumferential direction with the segment pole 7 being interposed therebetween.

As shown in FIG. 3, the inner stator 5 is configured by inner stator cores 5a and an inner stator winding 5b. The inner stator cores 5a each have an outer periphery which is provided with a plurality of (e.g., six for each pole) slots 5a1 formed between a plurality of teeth 5a2. The inner stator winding 5b is wound about the inner stator cores 5a.

The inner stator cares 5a are each configured such as by laminating a plurality of thin electromagnetic plates and integrated using bolts, nuts and the like. The integrated inner stator cores 5a are arranged so as to be coaxial with the rotary shaft 2 with a gap being provided between the stator cores 5a and the rotor 4. As shown in FIG. 2, the inner stator cores 5a are fixed to an outer periphery of the inner cylindrical portion 10a of the motor case 10.

Figure 4:
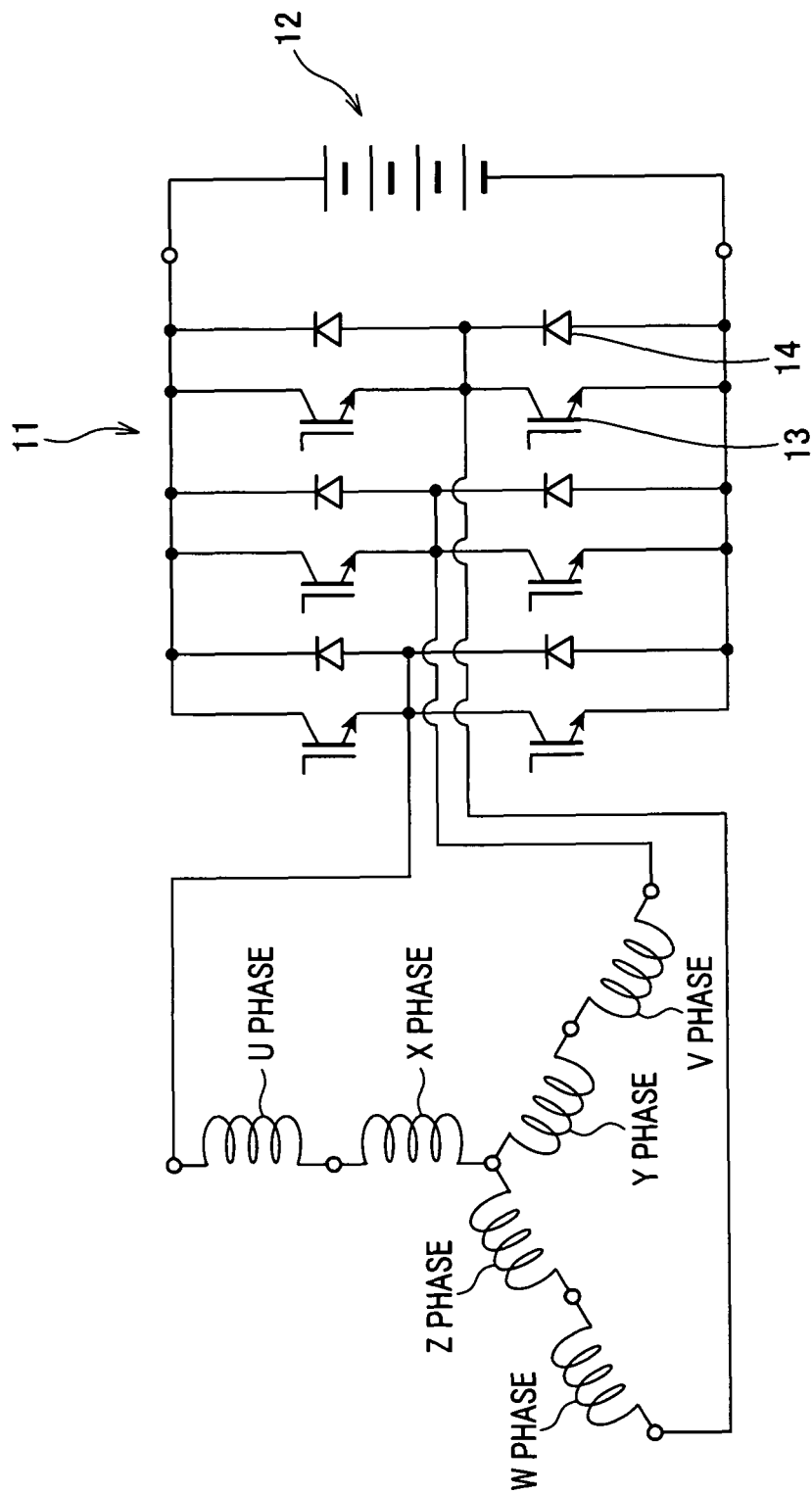
FIG. 4 is a circuit diagram illustrating specification and connecting method of the coils of inner and outer stators and a configuration of an inverter adopted in the first embodiment.

FIG. 4 is a circuit diagram illustrating specification and connecting method of coils of the inner and outer stators 5 and 6, and a configuration of an inverter 11. As shown in FIG. 4, the inner stator winding 5b is configured by Y-connecting three-phase (X-phase, Y-phase and Z-phase) coils whose phase is deviated from each other by 120°. The inner stator winding 5b configured by the three-phase coils is wound about the inner stator cores 5a in a distributed manner.

As shown in FIG. 3, the outer stator 6 is configured by outer stator cores 6a and an outer stator winding 6b. The outer stator cores 6a each have an inner periphery which is provided with a plurality of (e.g., six for each pole) slots 6a1 formed between a plurality of teeth 6a2. The outer stator winding 6b is wound about the outer stator cores 6a.

Similar to the inner stator cores 5a, the outer stator cores 6a are each configured such as by laminating a plurality of thin electromagnetic plates and integrated using bolts, nuts and the like. The integrated outer stator cores 6a are arranged so as to be coaxial with the rotary shaft 2 with a gap being provided between the stator cores 6a and the rotor 4. As shown in FIG. 2, the outer stator cores 6a are fixed to an inner periphery of the outer cylindrical portion 10b of the motor case 10.

As shown in FIG. 4, the outer stator winding 6b is configured by Y-connecting three-phase (U-phase, V-phase and W-phase) coils so whose phase is deviated from each other by 120°. The outer stator winding 6b configured by the three-phase coils is wound about the outer stator cores 6a in a distributed manner.

The inner and outer stators 5 and 6 are each configured to have poles whose number is the same as that of the segment poles 7 (twelve). Also, the inner and outer stators 5 and 6 are configured to have an equal magnetomotive force and be opposed to each other sandwiching the segment poles 7.

In the inner and outer stator windings 5b and 6b, coils of corresponding phases are connected in series. Specifically, as shown in FIG. 4, the U-, V- and W-phase coils of the outer stator winding 6b are connected in series to the Y-connected X-, Y- and Z-phase coils, respectively, of the inner stator winding 5b. Each of the inner and outer stator windings 5b and 6b has a neutral point of the phases in Y-connection and coil end portions on the other side of the neutral paint, which are connected to the inverter 11. The inverter 11 is connected to a battery 12 (DC power source). For example, the inverter 11 is configured by six transistors 13 and six feedback diodes 14 connected in inverse parallel with the respective transistors 13.

Hereinafter is described operation, i.e. power-running operation mode and regenerative operation mode, of the motor-generator 1.

The power-running operation mode is described first.

The battery 12 supplies DC current to the inverter 11 for conversion into AC current. The resultant AC current is then passed to the inner and outer stator windings 5b and 6b to generate rotating fields in each of the inner and outer stator windings 5b and 6b. Then, the generated rotating fields and the magnets 8 are attracted to each other to generate magnet torque. Meanwhile, reluctance torque is generated being induced by the difference between direct-axis inductance and quadrature-axis inductance. The magnet torque and the reluctance torque generated in this way cause the rotor 4 to rotate, involving integral rotation of the rotary shaft 2. Specifically, the motor-generator 1 functions as a motor, whereby the vehicle obtains drive force from both the engine and the motor-generator 1 so at the time of start and acceleration, for example. In this way, startability and accelerating ability are ensured.

The regenerative operation is described.

In deceleration (traveling with the accelerator pedal released), the drive force from the wheels is transmitted to the rotary shaft 2 to forcibly and integrally rotate the rotor 4 with the rotary shaft 2. As a result, AC current is generated in the inner and outer stator windings 5b and 6b. Specifically, the motor-generator 1 functions as a generator, whereby the AC current generated in the inner and outer stator windings 5b and 6b is rectified by the inverter 11 and charged into the battery 12. In this way, decelerating energy is regenerated in the form of electricity.

Hereinafter are described features and effects of the motor-generator 1.

FIG. 5 is a contour diagram illustrating magnetic flux flow of the generator-motor 1.

In the motor-generator 1 of the present embodiment, the magnetomotive force of the inner stator 5 is equal to that of the outer stator 6. In addition, the inner and outer stators 5 and 6 are arranged so as to be opposed to each other. Accordingly, as shown in FIG. 5, magnetic flux caused by the inner stator 5 and magnetic flux caused by the outer stator 6 can pass through each segment pole 7 in the circumferential direction. Thus, two magnetic flux loops are formed in parallel in each segment pole 7 as indicated by the arrows in FIG. 5.

As mentioned above, each of the magnets 8 is arranged between circumferentially adjacent segment poles 7 and magnetized in the circumferential direction. Therefore, magnetic flux supplied from each magnet 8 will be parallel to the inner and outer stators 5 and 6.

With the configuration described above, magnetic flux is circumferentially passed through each of the segment poles 7 by the inner and outer stators 5 and 6 to induce generation of torque. Also, the number of gaps for the magnetic flux to pass is only two regarding one magnetic flux loop. Therefore, in comparison with the known technique disclosed in JP-A-H03-139156 or JP-A-2007-251342 as mentioned above, magnetic resistance will be small in the magnetic circuit.

Further, with the configuration described above, the poles of the inner and outer stators 5 and 6 are not permitted to directly face the poles of the magnets 8. Therefore, the magnets 8 are not required to have excessive demagnetization strength against the demagnetizing fields emitted from the inner and outer stators 5 and 6. Thus, large torque is generated even when the magnetomotive force applied by the magnets 8 is small. In this way, the quantity of magnets to be used can be reduced.

In addition, with the configuration described above, the magnets 8 in use are not strong and thus strong magnetomotive force will not be applied. Therefore, magnetic flux leakage will be reduced and thus saturation of the cores will be mitigated accordingly to thereby suppress core loss. As a result, the efficiency in high-speed rotation is enhanced.

Further, in the inner and outer stators 5 and 6, the coils of corresponding phases are connected in series, and thus the current passed through the coils of the individual phases of the inner and outer stators 5 and 6 is regulated, allowing the inner and outer stators 5 and 6 to have an equal magnetomotive force. This will reduce the magnetic flux mutually interlinking between the inner and outer stators 5 and 6. As a result, direct-axis inductance is reduced, and thus, in turn, reluctance torque is increased.

Furthermore, with the configuration described above, each magnet 8 arranged between the circumferentially adjacent segment poles 7 is held by the bridges 9 connecting the circumferentially adjacent segment poles 7 on the circumferentially inner and outer sides. Therefore, each of the magnets 8 is reliably held against the centrifugal force caused with the rotation of the rotor 4.

Referring now to the performance data shown in FIGS. 6A and 6B, hereinafter is described the performances of the double-stator motor of the present invention applied to the motor-generator 1 of the first embodiment (hereinafter referred to as "inventive motor") and a double-stator motor of conventional art (hereinafter referred to as "conventional motor"). The performance data shown in FIGS. 6A and 6B have been obtained by analyzing the inventive motor and the conventional motor.

FIG. 6A shows analytical models and design specifications of inner and outer stators of the conventional motor and the inventive motor, as well as performance data of the conventional motor and the inventive motor for comparison.

As mentioned above, the conventional motor includes a rotor core having inner and outer surfaces opposed to an inner stator and an outer stator, respectively, and includes permanent magnets provided at the inner and outer surfaces of the rotor core. The winding magnetomotive force of the inner and outer stators is added in series to the magnetic fields formed by the permanent magnets to work on the rotor poles. Therefore, the number of gaps for the magnetic flux to pass will be four regarding a magnetic flux loop (magnetic flux flow indicated by the hollow arrows in the analytical model shown in FIG. 6A) of one pole pair.

On the other hand, as described in the first embodiment set forth above, the inventive motor is provided with the inner and outer stators 5 and 6 having an equal magnetomotive force and facing with each other sandwiching the segment poles 7. In addition, each of the magnets 8 is arranged between circumferentially adjacent segment poles 7. Therefore, magnetic flux supplied from the magnets 8 also becomes parallel to the inner and outer stators 5 and 6. Thus, two magnetic loops are parallelly formed as indicated by the arrows in the analytical model shown in FIG. 6A. As a result, the number of gaps for the magnetic flux to pass is only two regarding one magnetic flux loop.

Let us now compare the performance data of the conventional motor with those of the inventive motor. In the conventional motor, the volume of the neodymium magnets in use is 155.8 cm$^3$, the low-speed torque generated at 1000 rpm is 220 [Nm], and the high-speed torque generated at 8000 rpm is 20 [Nm]. In the inventive motor, the volume of the neodymium magnets in use is 33.6 cm$^3$, the low-speed torque is 230 [Nm] and the high-speed torque is 70 [Nm].

FIG. 6B shows a bar graph comparing the conventional motor and the inventive motor regarding the low-speed torque, the high-speed torque and the volume of neodymium magnets mentioned above to clarify the differences. In FIG. 6B, each of the values of the inventive motor is indicated by 100%.

As is apparent from the bar graph, the inventive motor is able to obtain high generated torque using small quantity of magnets in comparison with the conventional motor. In particular, it will be understood that the inventive motor exerts a great effect of reducing the quantity of neodymium magnets to be used. Thus, the inventive motor is able to generate larger low-speed torque and larger high-speed torque than the conventional motor, using smaller quantity of magnets than the conventional motor. Therefore, the inventive motor can be fabricated at low cost by drastically reducing the quantity of magnets to be used. In addition, the inventive motor can contribute to the improvement of fuel efficiency by enhancing the efficiency in high-speed rotation.

Second Embodiment

Figure 7:
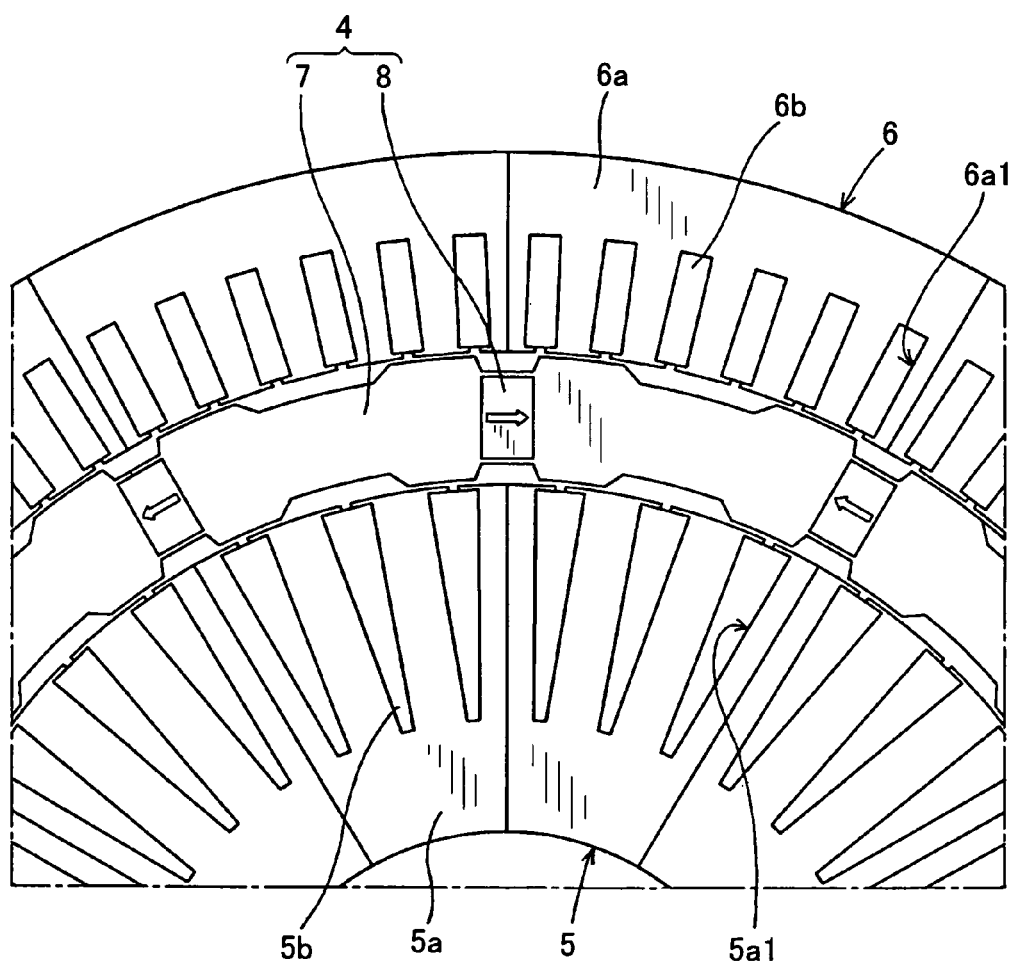
FIG. 7 is a partial cross-sectional diagram illustrating the structure of a principal part of a motor according to a second embodiment of the present invention.

Referring to FIG. 7, hereinafter is described a second embodiment. In the second and the subsequent embodiments, the components identical with or similar to those in the first embodiment are given the same reference numerals for the sake of omitting explanation.

FIG. 7 is a partial cross-sectional diagram illustrating the structure of a principal part of a motor according to the second embodiment.

In the second embodiment, the number of slots of the inner stator 5 is smaller than that of the outer stator 6. Also, each slot 5a1 of the inner stator 5 has a cross section larger than in the first embodiment.

For example, as shown in FIG. 7, six slots are formed for each pole of the outer stator 6 similar to the first embodiment, while three slots are formed for each pole of the inner stator 5, with the cross section of each of the slots 5a1 being designed to be large.

In the first embodiment exemplified above, the number of slots of the inner and outer stators 5 and 6 has been set to the same number (e.g., six for each pole), in such a configuration, the inner stator core 5a of the inner stator 5 located on the inner side of the rotor 4 has a smaller circumferential width than that of the outer stator core 6a of the outer stator 6 located on the outer side of the rotor 4. Therefore, necessarily, the cross section of each slot 5a1 will be small, involving difficult winding work accordingly.

Contrary to this, when the number of slots of the inner stator 5 is set to a smaller number than that of the outer stator 6 as in the present embodiment, each slot 5a1 of the inner stator 5 is permitted to have a large cross section. As a result, winding work is facilitated, or winding is easily imparted to the inner stator 5.

Third Embodiment

Referring to FIGS. 8A, 8B to 10A, 10B, hereinafter is described a third embodiment of the present invention.

As described in the first embodiment, the inner and outer stators 5 and 6 have an equal electromotive force in the inventive motor. In addition, the inner and outer stators 5 and 6 are arranged face to face sandwiching the segment poles 7. Therefore, two magnetic flux loops are formed in parallel. As a result, the number of gaps for the magnetic flux to pass is only two regarding one magnetic flux loop.

Thus, compared to the conventional motor, magnetic resistance of the magnetic circuit is reduced. In order to take advantage of this low magnetic resistance, concentrated winding is used in the third embodiment. In an example of the third embodiment, the three-phase coils of the inner and outer stators 5 and 6 are wound, in a concentrated manner, about the core teeth 5a2 and 6a2 formed in the inner and outer stator cores 5a and 6a, respectively.

Unlike the distributed winding described in the first embodiment, concentrated winding involves no overlap between coil end portions, and thus can reduce the length of coil perimeter to thereby reduce coil resistance. In other words, owing to the low resistance, the number of winding turns may be increased accordingly in the concentrated winding than in the distributed winding to thereby increase the winding magnetomotive force.

However, concentrated winding cannot realize uniform distribution of magnetic resistance over an angle of rotation. Specifically, in concentrated winding, magnetic resistance is relatively small in the direction in which winding is provided because of the presence of the core teeth 5a2 and 6a2. Meanwhile, magnetic resistance will be increased in the intermediate portion of the adjacently located turns of winding. As a result, magnetic flux density will be uneven, causing uneven magnetic saturation.

Figure 8A:
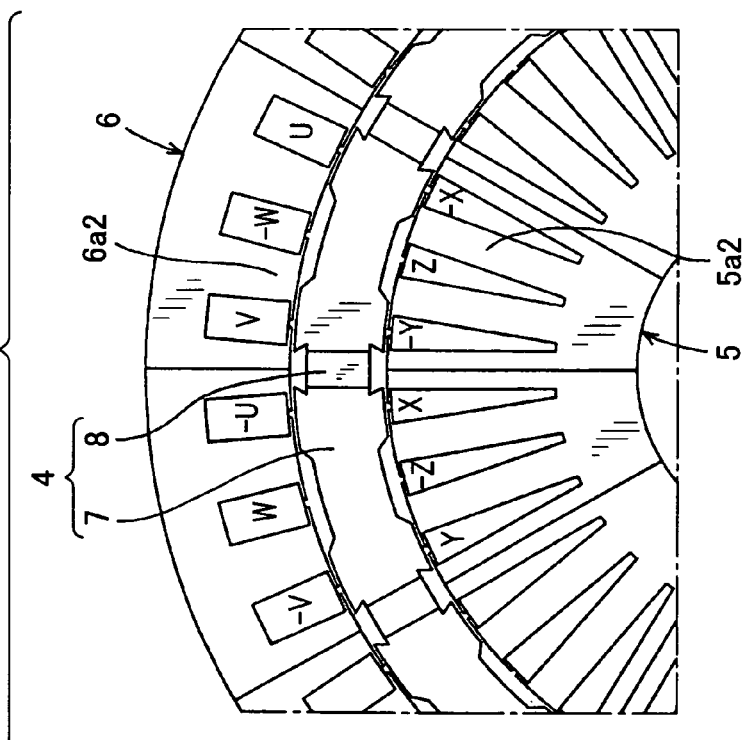
FIG. 8A is a diagram illustrating a model of distributed winding according to a third embodiment of the present invention.
Figure 8B:
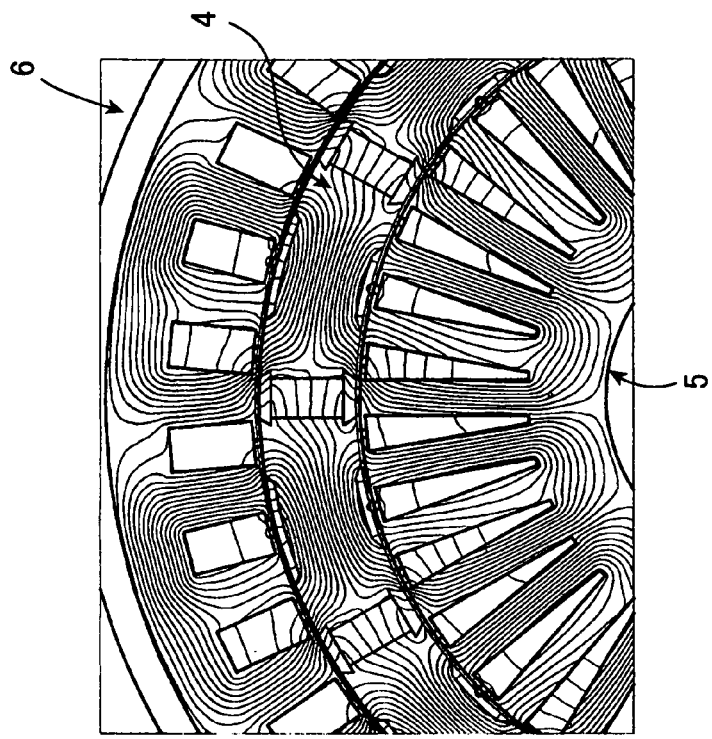
FIG. 8B is a contour diagram analyzing the magnetic flux density of the distributed winding model illustrated in FIG. 7A.
Figure 9B:
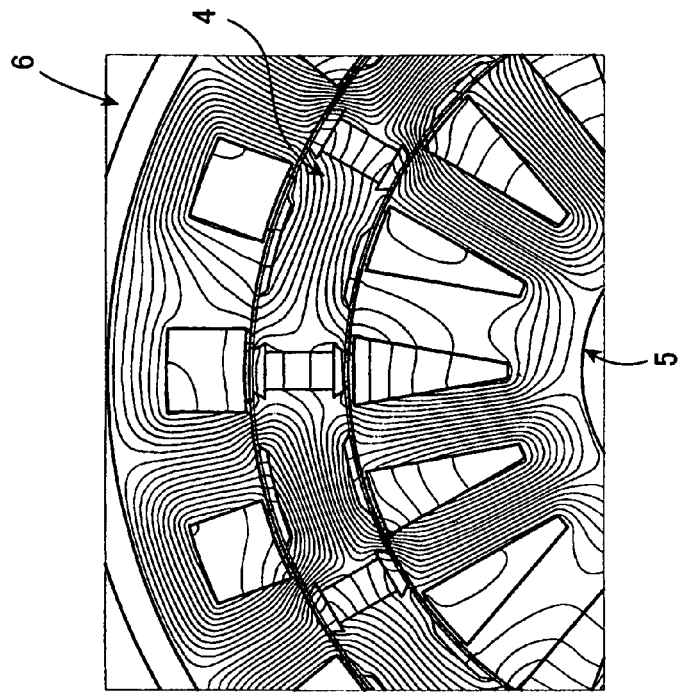
FIG. 9B is a contour diagram analyzing the magnetic flux density of the concentrated winding model illustrated in FIG. 8A.
Figure 9A:
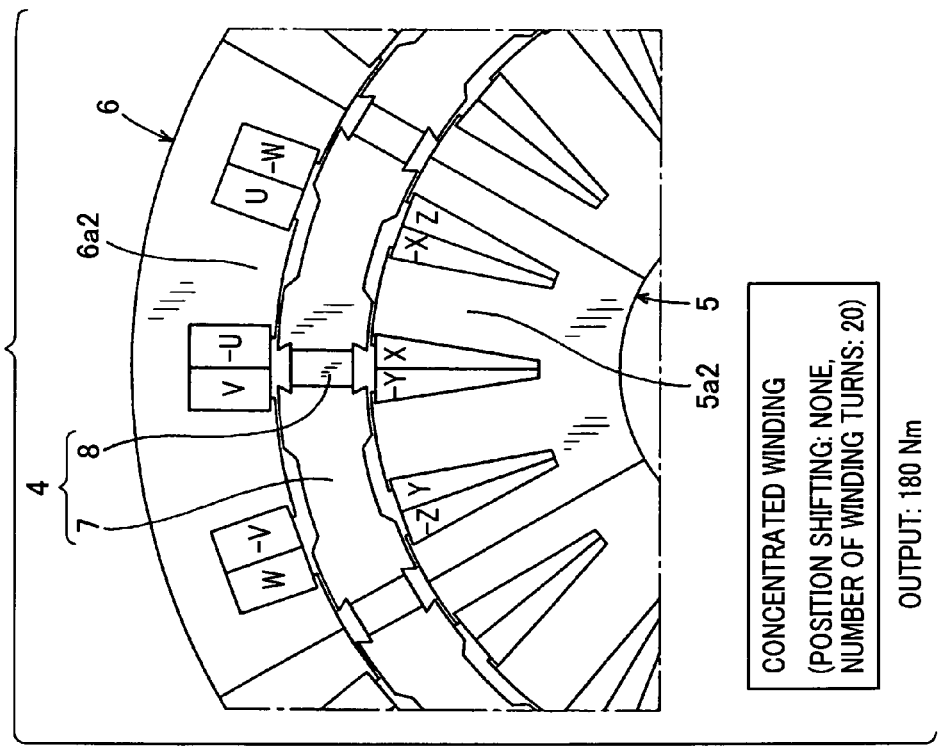
FIG. 9A is a diagram illustrating a model of concentrated winding according to the third embodiment.

FIGS. 5A to 9B show the results of analysis conducted of magnetic flux density using models of distributed winding and concentrated winding. FIGS. 8A and 8B show distributed winding, while FIGS. 9A and 9B show concentrated winding.

As shown in the model of distributed winding of FIG. 8A, the inner and outer stators 5 and 6 have six core teeth 5a2 and 6a2, respectively, and sixteen turns of winding in an electrical angle of 2π. On the other hand, as shown in the model of concentrated winding of FIG. 9A, the inner and outer stators 5 and 6 have three core teeth 5a2 and 6a2, respectively, and twenty turns of winding in an electrical angle of 2π.

As can be seen from the results of analysis, regarding distributed winding, magnetic flux density is even in the segment poles 7 as shown in FIG. 8B. Meanwhile, regarding concentrated winding, magnetic flux density is uneven between the circumferentially adjacent segment poles 7 as shown in FIG. 9B, causing uneven magnetic saturation.

Another analysis has been conducted using an improved model of concentrated winding.

Figure 10A:
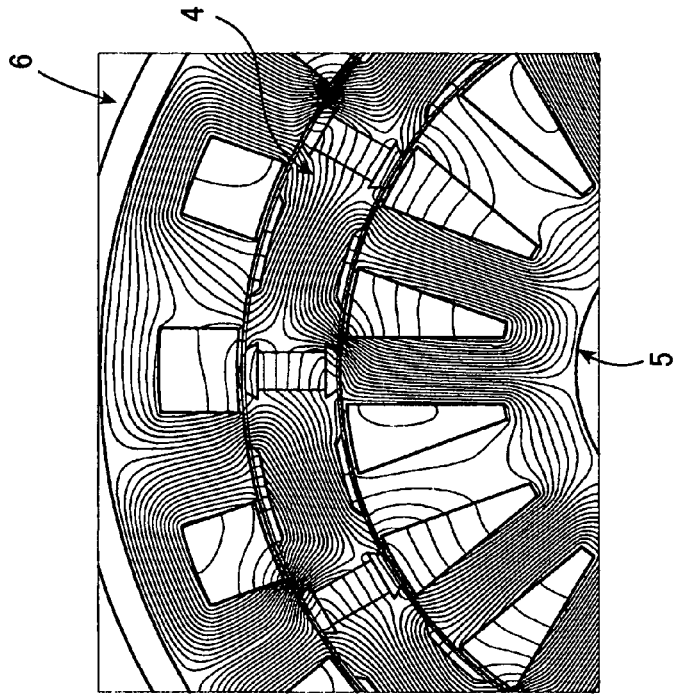
FIG. 10A is a diagram illustrating a model of improved concentrated winding according to the third embodiment.
Figure 10B:
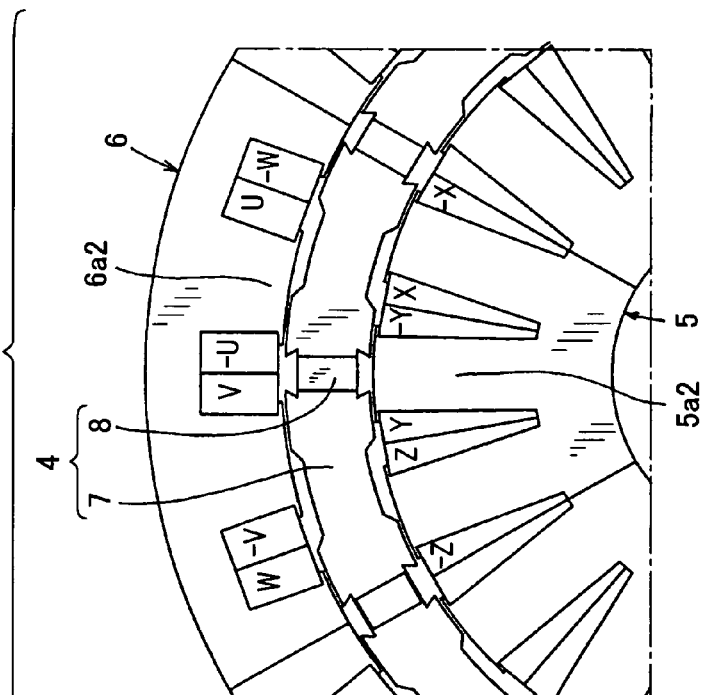
FIG. 10B is a contour diagram analyzing the magnetic flux density of the improved concentrated winding model illustrated in FIG. 9A.

In the improved model, the core teeth 5a2 of the inner stator 5 are arranged being circumferentially shifted from the core teeth 6a2 of the outer stator 6. FIGS. 10A and 10B show the improved model of concentrated winding. As specifically shown in FIG. 10A, the core teeth 5a2 of the inner stator 5 are arranged with an electrical angular difference of 60° in the circumferential direction with reference to the core teeth 6a2 of the outer stator 6. More specifically, in the case of arranging three care teeth 5a2 and three core teeth 6a2 in the inner and outer stators 5 and 6, respectively, in an electrical angle of 2π, each core tooth 5a2 of the inner stator 5 is arranged so as to fall on the center position between the adjacently located core teeth 6a2 of the outer stator 6.

As a result of the analysis using the improved model of concentrated winding, as can be seen from FIG. 10B, magnetic flux density of the individual segment poles 7 has turned out to be even, eliminating the unevenness of magnetic saturation. Also, comparing with the model before improvement, it has been proved that the output is drastically enhanced in the improved model.

As described above, the number of turns of winding may be increased by changing the manner of winding from distributed winding to concentrated winding. Also, magnetic flux density may be made even in the segment poles 7 by arranging each core tooth 5a2 of the inner stator 5 such that the circumferential position thereof falls between the adjacently located core teeth 6a2 (desirably, falls on the center between the adjacently located core teeth 6a2) of the outer stator 6. As a result, output per physical size is enhanced, and thus the quantity of magnets 8 to be used is reduced for a set requested output, thereby reducing the fabrication cost.

Fourth Embodiment

Figure 11:
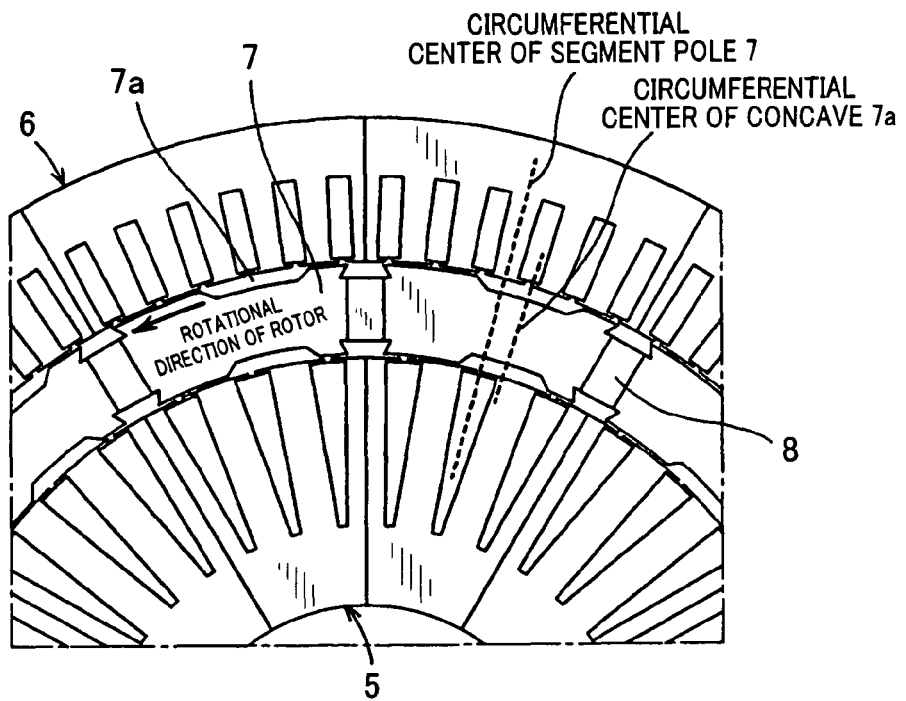
FIG. 11 is a partial cross-sectional diagram illustrating the structure of a principal part of a motor according to a fourth embodiment of the present invention.
Figure 12:
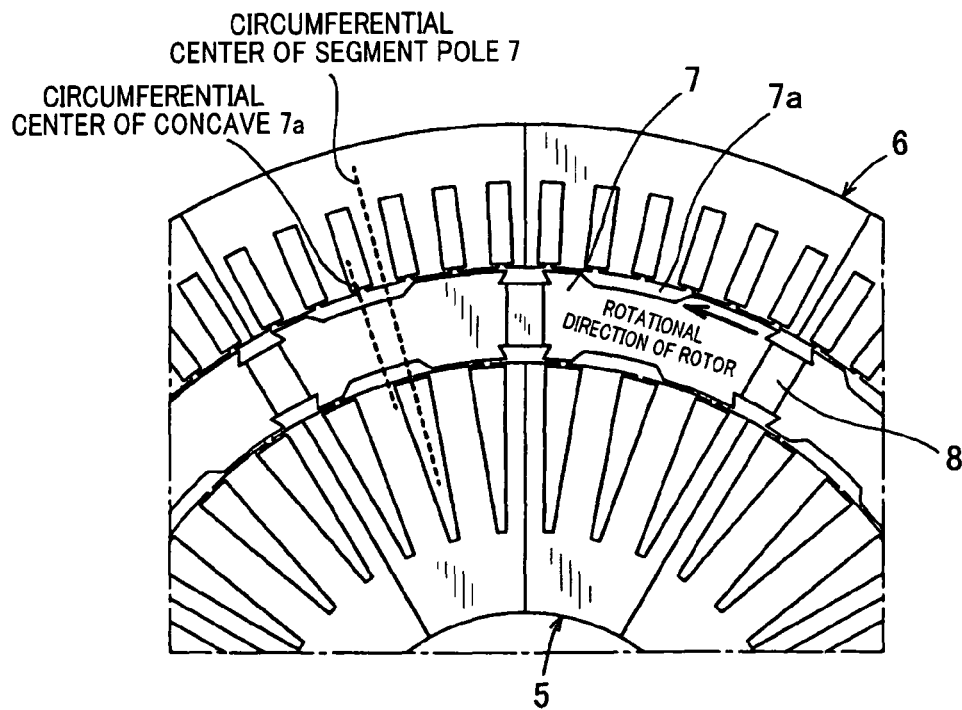
FIG. 12 is a partial cross-sectional diagram illustrating the structure of a principal part of the motor according to the fourth embodiment of the present invention.

Referring now to FIGS. 11 and 12, hereinafter is described a fourth embodiment. In the first embodiment described above, each segment pole 7 has the inner and outer peripheral surfaces in the radial direction, in each of which a concave 7a is formed in the circumferentially center portion of the segment pole 7. In this regard, in an example of the fourth embodiment, the concave 7a is formed at an asymmetrical position in each of the inner and outer peripheral surfaces with reference to the circumferential center of the segment pole 7. The asymmetrical position may be, with regard to the rotational phase, on the forward or backward side of the rotational direction of the rotor.

In the motor-generator 1 described in the first embodiment, magnetic distribution has been unbalanced with reference to the circumferential direction in the power-running operation functioning as a motor or in the regenerative operation functioning as a generator. To cope with this, for example, the position of each concave 7a may be brought to the backward side of the rotational direction of the rotor, as shown in FIG. 11, with reference to the circumferential center of the segment pole 7. With this configuration, torque is increased in the power-running operation to thereby enhance the function as a motor.

On the other hand, the position of each concave 7a may be brought to the forward side of the rotational direction of the rotor, as shown in FIG. 12, with reference to the circumferential center of the segment pole 7. This configuration exerts a good effect in the regenerative operation, and thus the function as a generator is enhanced.

For the sake of completeness, it should be mentioned that the various embodiments explained so far are not definitive lists of possible embodiments. The expert will appreciate that it is possible to combine the various construction details or to supplement or modify them by measures known from the prior art without departing from the basic inventive principle.

What is claimed is:

1. A double-stator motor comprising:
    a rotary shaft;
    an annular rotor coupled with the rotary shaft so that the rotor is allowed to rotate together with the rotary shaft, the rotor having a radial direction and a circumferential direction;
    a first three-phase stator arranged inside the rotor in the radial direction and provided with a first winding wound at the first three-phase stator, the first winding generating a first rotating magnetic field in response to a three-phase current being supplied to the first winding; and
    a second three-phase stator arranged outside the rotor in the radial direction and provided with a second winding wound at the second three-phase stator, the second winding generating a second rotating magnetic field in response to the three-phase current being supplied to the second winding,
    wherein the rotor comprises:
        i) an even number of segment poles made of soft magnetic material and mutually separately arranged at positions of the rotor, the positions being equally distanced apart from the rotary shaft in the radial direction and evenly spaced apart from one another in the circumferential direction, each of the segment poles having outer and inner circumferential surfaces in the radial direction and having a concave formed at a circumferential center of each of the outer and inner circumferential surfaces or at a circumferential center of either one of the outer and inner circumferential surfaces,
        ii) an even number of bridges, each bridge being disposed between a mutually-adjacent two of the segment poles in the circumferential direction such that each bridge links the mutually-adjacent two segment poles, each bridge including a plurality of inner bridges and a plurality of outer bridges, the inner and outer bridges being respectively located inside and outside of the rotor in the radial direction, each inner bridge linking radially inner parts of the mutually-adjacent two segment poles, each outer bridge linking radially outer parts of the mutually-adjacent two segment poles, and
        iii) a plurality of permanent magnets, each of the permanent magnets being disposed between the inner and outer bridges at each of the segment poles, each of the permanent magnets having magnetic poles directed at each of the segment poles in the circumferential direction; and
    each of the first and second three-phase stators has poles which are the same in number as the segment poles and the poles produce magnetomotive forces whose directions are opposed to each other via the segment poles between the mutually-opposed poles of the first and second three-phase stators.

2. The double-stator motor of claim 1, wherein the first and second windings generate the magnetomotive forces which are equal to each other, each of the magnetomotive forces being defined as a product of the number of windings per each phase and current passing through the windings.

3. The double-stator motor of claim 2, wherein the first winding is electrically connected in series to the second stator every phase corresponding to the phase between the first and second three-phase stators.

4. The double-stator motor of claim 3, wherein the first and second three-phase stators have slots in which the first and second windings are wound respectively, the slots of the first three-phase stator being larger in a circumferential sectional area of each slot and smaller in the number of slots than the slots of the second three-phase stator.

5. The double-stator motor of claim 3, wherein the first and second three-phase stators have the same number of core teeth around which the first and second windings are concentrated-wound respectively, the core teeth of the first three-phase stator being the same in number as the core teeth of the second three-phase stator,
    wherein each of the core teeth of the first three-phase stator is, in the circumferential direction, located between two core teeth mutually adjacently located among the core teeth of the second three-phase stator.

6. The double-stator motor of claim 5, wherein each of the core teeth of the first three-phase stator is, in the circumferential direction, located at a center between the two core teeth mutually adjacently located among the core teeth of the second three-phase stator.

7. The double-stator motor of claim 2, wherein the first and second three-phase stators have slots in which the first and second windings are wound respectively, the slots of the first three-phase stator being larger in a circumferential sectional area of each slot and smaller in the number of slots than the slots of the second three-phase stator.

8. The double-stator motor of claim 1, wherein each of the concaves of the segment poles is asymmetrically positioned to a center of a corresponding one of the segment poles in the circumferential direction so that each of the concaves is positioned on either a forward side or a backward side in rotational phase in a rotational direction of the motor.

9. The double-stator motor of claim 1, wherein the first winding is electrically connected in series to the second winding every phase corresponding to the phases between the first and second three-phase stators.

10. The double-stator motor of claim 9, wherein the first and second three-phase stators have the same number of core teeth around which the first and second windings are concentrated-wound respectively, the core teeth of the first three-phase stator being the same in number as the core teeth of the second three-phase stator,
    wherein each of the core teeth of the first three-phase stator is, in the circumferential direction, located between two core teeth mutually adjacently located among the core teeth of the second three-phase stator.

11. The double-stator motor of claim 10, wherein each of the core teeth of the first three-phase stator is, in the circumferential direction, located at a center between the two core teeth mutually adjacently located among the core teeth of the second three-phase stator.

12. The double-stator motor of claim 1, wherein the first and second three-phase stators have slots in which the first and second windings are wound respectively, the slots of the first three-phase stator being larger in a circumferential sectional area of each slot and smaller in the number of slots than the slots of the second three-phase stator.

13. The double-stator motor of claim 1, wherein the first and second three-phase stators have the same number of core teeth around which the first and second windings are concentrated-wound respectively, the core teeth of the first three-phase stator being the same in number as the core teeth of the second three-phase stator, wherein each of the core teeth of the first three-phase stator is, in the circumferential direction, located between two core teeth mutually adjacently located among the core teeth of the second three-phase stator.

14. The double-stator motor of claim 1, wherein each of the concaves of the segment poles is symmetrically positioned to a center of a corresponding one of the segment poles in the circumferential direction.

\* \* \* \* \*